(12) United States Patent
Shen et al.

(10) Patent No.: US 10,823,209 B2
(45) Date of Patent: Nov. 3, 2020

(54) CLAMP ASSEMBLIES AND GRILLE ASSEMBLIES WITH WIRE HARNESS CLAMP ATTACHMENT STRUCTURES

(71) Applicant: Toyota Motor Engineering & Manufacturing North America, Inc., Plano, TX (US)

(72) Inventors: Mingher F. Shen, Ann Arbor, MI (US); Braden Cuss, Saline, MI (US); Andrew V. Manzanero, Ontario, CA (US); Nora Arellano, Ann Arbor, MI (US)

(73) Assignee: Toyota Motor Engineering & Manufacturing North America, Inc., Plano, TX (US)

(\*) Notice: Subject to any disclaimer, the term of this patent is extended or adjusted under 35 U.S.C. 154(b) by 232 days.

(21) Appl. No.: 16/152,973

(22) Filed: Oct. 5, 2018

(65) Prior Publication Data
US 2020/0109725 A1 Apr. 9, 2020

(51) Int. Cl.
*F16B 2/22* (2006.01)
*H02G 3/32* (2006.01)
(Continued)

(52) U.S. Cl.
CPC .............. *F16B 2/22* (2013.01); *B60K 11/02* (2013.01); *B60R 16/0207* (2013.01); *H02G 3/32* (2013.01)

(58) Field of Classification Search
CPC ... B60R 19/52; B60R 2019/525; B60R 19/18; B60R 2019/1886; B60R 2019/486;
(Continued)

(56) References Cited

U.S. PATENT DOCUMENTS 6,923,407 B2 8/2005 Takeuchi
7,019,215 B2 3/2006 Arai
(Continued)

FOREIGN PATENT DOCUMENTS

FR 3016937 B1 9/2016
JP 2017065337 A 4/2017
JP 2018061409 A 4/2018

OTHER PUBLICATIONS

"GM wiring harness clips wire clips (20) 19853 engine compartment frame rails", Jul. 26, 2018; URL: https://www.ebay.com/itm/GM-Wiring-Harness-Clips-wire-clips-20-19853-Engine-Compartment-Frame-rails-/160971688389.

*Primary Examiner* — D Glenn Dayoan
*Assistant Examiner* — Sunsurraye Westbrook
(74) *Attorney, Agent, or Firm* — Dinsmore & Shohl LLP

(57) ABSTRACT

A clamp assembly includes a housing having an attachment surface defining a keyed slot. The keyed slot includes a first pair of recesses extending in a first direction and a second pair of recesses extending in a second direction. The attachment surface includes an outwardly extending protrusion. The assembly includes a clamp having a main body including an intermediate portion positioned between distal and proximate end portions, and a connection portion extending outwardly from the intermediate portion. The connection portion is configured to be inserted within the keyed slot in an insertion direction. The clamp is configured to be received within the keyed slot and rotatable between an engaged and disengaged position. In the engaged position the connection portion engages the first pair of recesses to inhibit movement in an extraction direction and the proximate end portion abuts the protrusion to inhibit rotation of the clamp to the disengaged position.

20 Claims, 13 Drawing Sheets

(51) Int. Cl.
*B60R 16/02* (2006.01)
*B60K 11/02* (2006.01)

(58) Field of Classification Search
CPC ........ B60R 2019/527; B60R 2019/505; B60R 13/005; B60R 19/023; B60K 11/085; B60K 11/08; B60K 11/04; B60K 13/02; B60K 11/02; F16B 21/09; F16B 5/00; F16B 5/0225
USPC ............. 296/193.1, 187.09, 193.11, 29, 191, 296/187.01, 203.02; 293/115, 117, 102, 293/120, 132, 133; 180/38.1, 68.6, 68.3, 180/69.2, 69.21
See application file for complete search history.

(56) References Cited

U.S. PATENT DOCUMENTS

| | | | |
|---|---|---|---|
| 7,045,715 B2 | 5/2006 | Ono | |
| 7,866,612 B2 | 1/2011 | Doi et al. | |
| 8,157,222 B1 * | 4/2012 | Shirey | H02G 3/32 248/68.1 |
| 9,172,229 B2 | 10/2015 | Doushita et al. | |
| 9,899,822 B2 * | 2/2018 | Richardson | B60R 16/0222 |
| 2001/0023778 A1 * | 9/2001 | Kondoh | H02G 3/32 174/135 |
| 2001/0054671 A1 * | 12/2001 | Kondo | F16L 3/1025 248/74.3 |

* cited by examiner

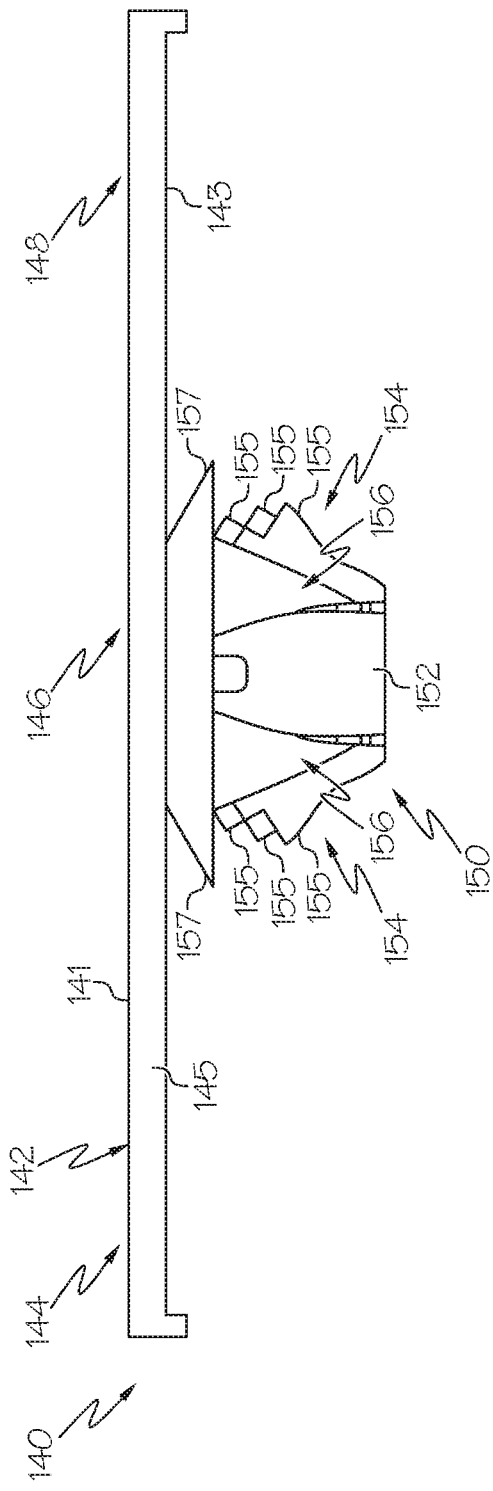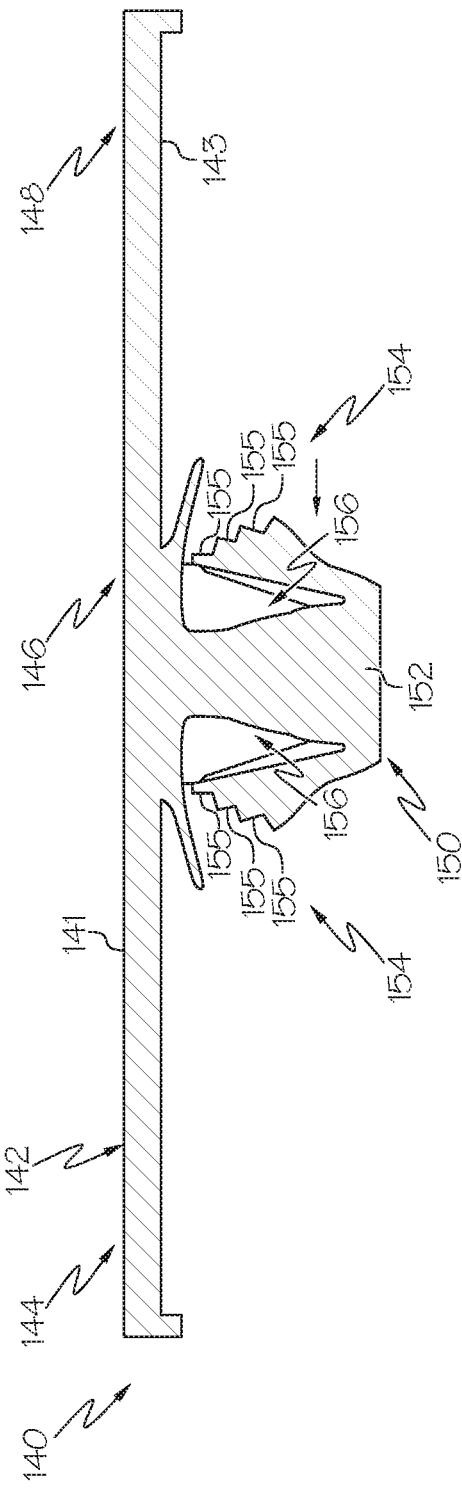

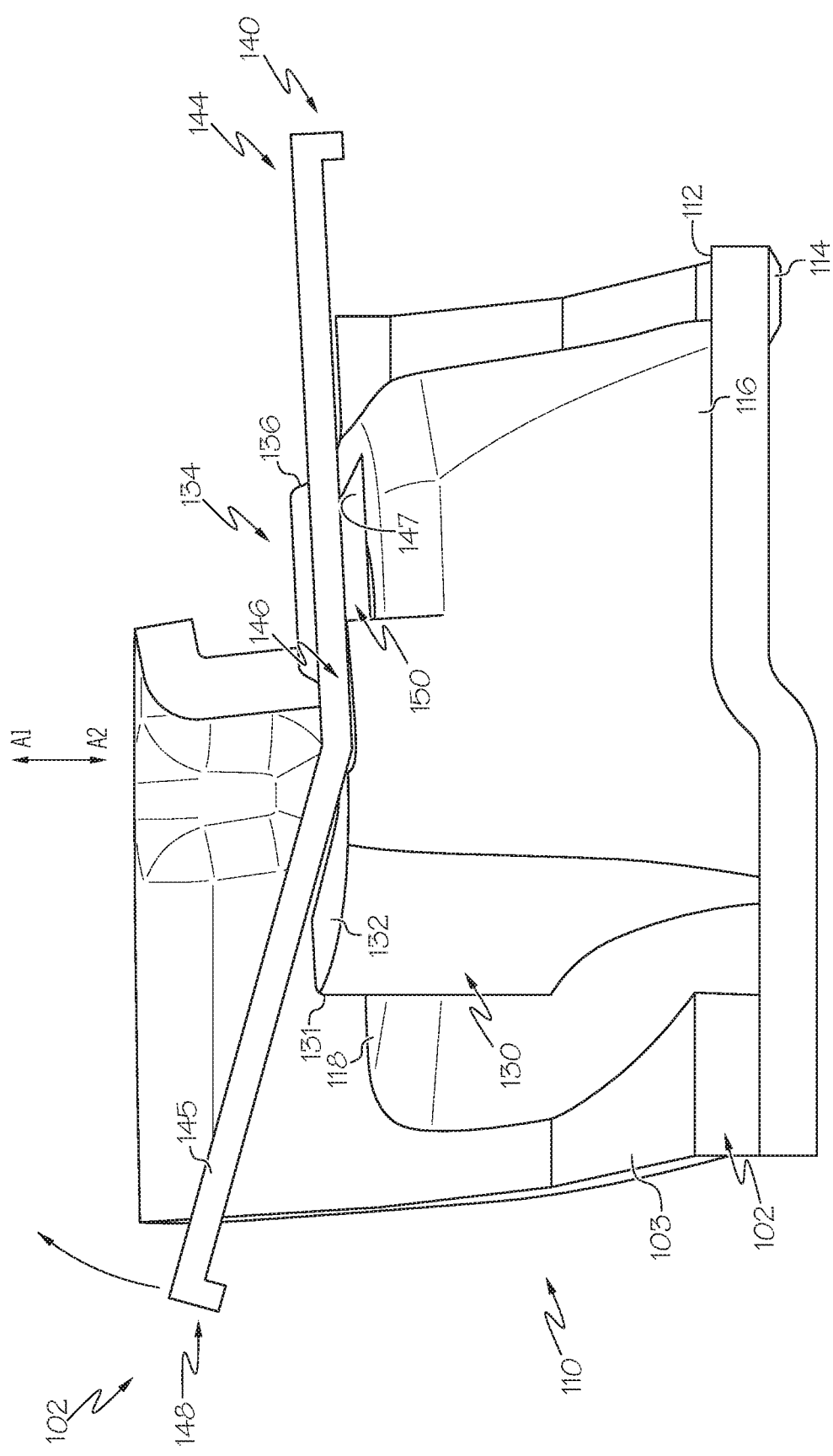

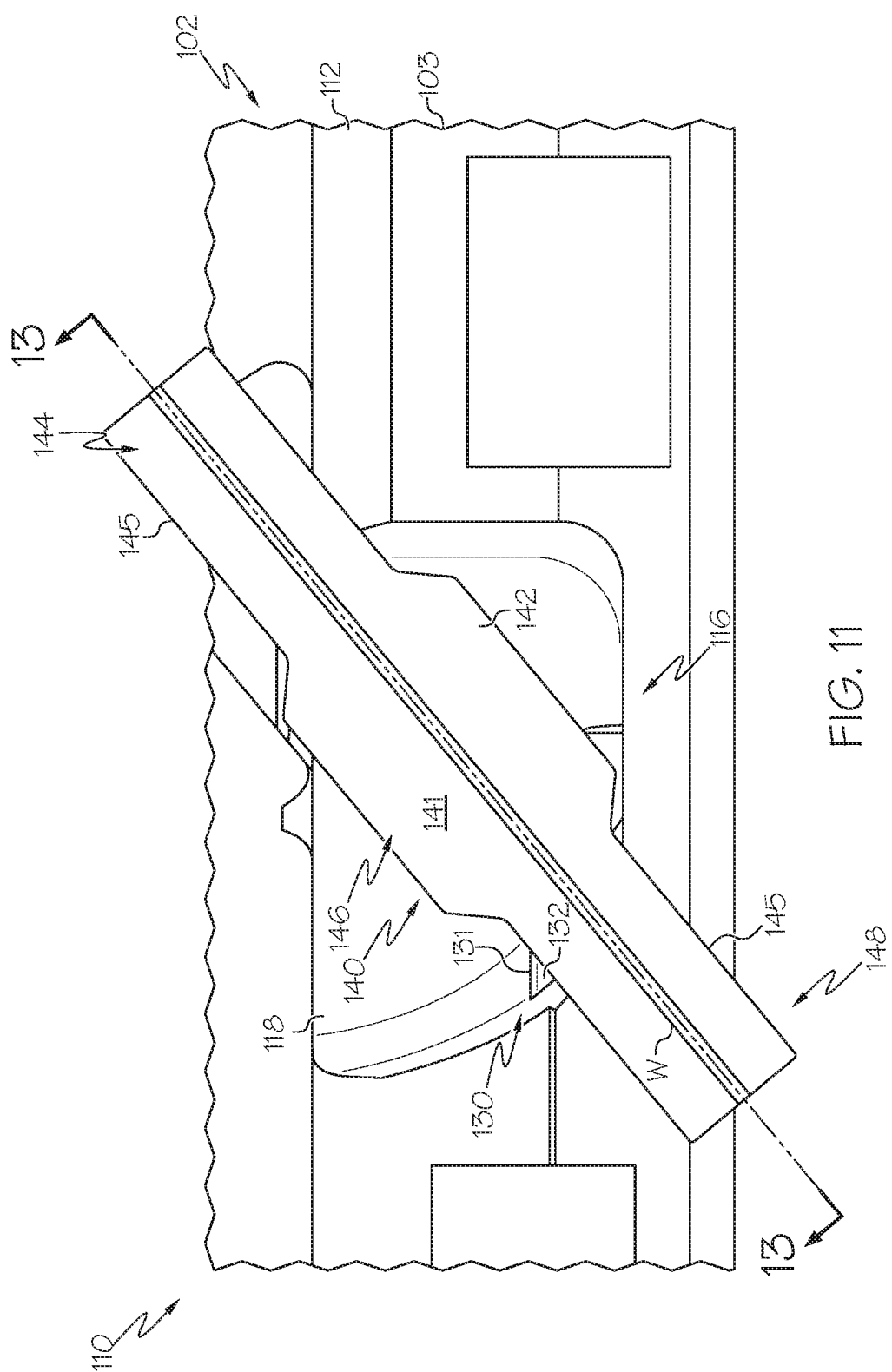

CLAMP ASSEMBLIES AND GRILLE ASSEMBLIES WITH WIRE HARNESS CLAMP ATTACHMENT STRUCTURES

TECHNICAL FIELD

The present specification generally relates to clamp assemblies and grille assemblies of vehicles and, more specifically, to clamp assemblies and grille assemblies that include a housing having an attachment surface that facilitates connection of a wire harness clamp.

BACKGROUND

Wire harnesses organize a set of wires that run throughout a vehicle to relay electric power and signals to a variety of electrical components on the vehicle. It has been known to attach the wire harness onto a grille assembly of the vehicle using steel brackets positioned along an interior surface of the grille for securing the wire harness.

The wire harness is generally secured to a wire harness clamp that is capable of attaching to the steel brackets of the grille assembly, such that the wire harness clamps serve to securely fasten the wire harness to the grille assembly. During service of an engine of the vehicle and for various other purposes, the front grille assembly is generally required to be detached from the vehicle to provide access to the engine. With the wire harness clamp secured to the front grille assembly, disengagement of the wire harness clamp is necessary. In this instance, disconnecting the wire harness clamp from the steel brackets of the front grille assembly may be difficult due to the complex engagement system between the wire harness clamp and the grille.

Accordingly, a need exists for front grille assemblies having simplified wire harness clamp attachment structure that can be used to facilitate easy engagement and disengagement of wire harness clamps to grille assemblies.

SUMMARY

In one embodiment, a clamp assembly includes a housing that includes an attachment surface that defines a keyed slot, the keyed slot having a first pair of recesses that extend in a first direction and a second pair of recesses that extend in a second direction different from the first direction, the attachment surface includes an outwardly extending protrusion. The clamp assembly includes a clamp that includes a main body and a connection portion, the main body includes an intermediate portion positioned between a distal end portion and a proximate end portion, the connection portion extends outwardly from the intermediate portion. At least a portion of the connection portion is configured to be inserted within the keyed slot in an insertion direction, and the clamp configured to be received within the keyed slot and rotatable between an engaged position and a disengaged position. In the engaged position the connection portion engages within the first pair of recesses of the keyed slot to inhibit movement in an extraction direction opposite the insertion direction and the proximate end portion abuts the protrusion to inhibit rotation of the clamp from the engaged position to the disengaged position.

In another embodiment, a grille assembly includes a grille that includes an outer surface and an opposite inner surface, the grille includes a housing that extends outwardly from the inner surface. The housing includes an attachment surface that defines a keyed slot, the keyed slot having a first pair of recesses that extend in a first direction and a second pair of recesses that extend in a second direction different from the first direction, the attachment surface includes an outwardly extending protrusion. The assembly includes a clamp that includes a main body and a connection portion, the main body includes an intermediate portion positioned between a distal end portion and a proximate end portion. The connection portion extends outwardly from the intermediate portion and at least a portion of the connection portion is configured to be inserted within the keyed slot in an insertion direction. The clamp is configured to be received within the keyed slot and rotatable between an engaged position and a disengaged position, in the engaged position the connection portion engages within the first pair of recesses of the keyed slot to inhibit movement in an extraction direction opposite the insertion direction and the proximate end portion abuts the protrusion to inhibit rotation of the clamp from the engaged position to the disengaged position. In the disengaged position the connection portion is received within the second pair of recesses and permits movement in the extraction direction.

In another embodiment, a method of connecting a component to a grille of a vehicle, the component is secured to a clamp and the grille having a housing that extends outwardly from an inner surface of the grille and includes an attachment surface that includes a keyed slot having a first pair of recesses that extend in a first direction and a second pair of recesses that extend in a second direction different from the first direction. The method includes inserting a connection portion of the clamp in an insertion direction into the pair of first recesses of the keyed slot into an engaged position, the connection portion extending from an intermediate portion of a main body of the clamp, and the intermediate portion positioned between a proximate end portion and a distal end portion, in the engaged position the clamp is inhibited from movement in an extraction direction opposite the insertion direction. In the engaged position the proximate end portion abuts a protrusion that extends outwardly from the attachment surface to prevent rotation of the clamp from the engaged position to a disengaged position. The method further includes lifting the proximate end portion of the clamp away from the attachment surface to raise the proximate end portion over the protrusion and rotating the clamp from the engaged position to the disengaged position in which the connection portion is received within the second pair of recesses of the keyed slot. In the disengaged position the clamp is permitted to move in the extraction direction. The method further includes removing the s clamp from the keyed slot in the extraction direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts a side view of a wire harness clamp with a pair of snap tabs, according to one or more embodiments shown and described herein;

FIG. 5 depicts a cross sectional view of the wire harness clamp of FIG. 4 with at least one of the pair of snap tabs compressed inwardly, according to one or more embodiments shown and described herein;

FIG. 10A depicts a perspective view of the wire harness clamp of FIG. 4 attached to the housing of FIG. 1 in the engaged position, with a proximate end portion of the wire harness clamp raised over a protrusion of the housing, according to one or more embodiments shown and described herein;

FIG. 11 depicts a plan view of the wire harness clamp of FIG. 4 attached to the housing of FIG. 1 in the disengaged position, according to one or more embodiments shown and described herein;

DETAILED DESCRIPTION

Embodiments described herein generally relate to clamp assemblies configured to releasably couple a wire harness to a grille assembly, such as, for example, a radiator grille of a vehicle. One non-limiting example of a wire harness clamp assembly may generally include a clamp that includes a main body and a connection portion. The main body includes an intermediate portion positioned between a distal end portion and a proximate end portion of the main body, and the connection portion extends outwardly from the intermediate portion.

The clamp assembly further includes a grille including housing that extends outwardly from an inner surface of the radiator grille. The housing includes an attachment surface defining a keyed slot with a first pair of recesses extending in a first direction and a second pair of recesses extending in a second direction that is different from the first direction. The attachment surface further includes a protrusion extending outwardly therefrom. The connection portion of the clamp is configured to be inserted into the keyed slot and rotatable between an engaged position and a disengaged position.

In the embodiments described herein, the phrase "vehicle-longitudinal direction" refers to the forward-rearward direction (i.e., the +/−x direction of the coordinate axes in the figures). The phrase "vehicle-vertical direction" refers to the upward-downward direction (i.e., the +/−z direction of the coordinate axes in the figures). The phrase "vehicle-lateral direction" refers to the left-right direction (i.e., the +/−y direction of the coordinate axes in the figures). Further, the terms "inboard" and "outboard" are used to describe the relative positioning of various components of the vehicle with respect to a centerline of the vehicle. As used herein, the terms "lateral," "longitudinal," "inward," "outward," "distal," "proximal" and "proximate" are used to describe the relative positioning of various components of the assembly.

Motor vehicles that incorporate elements according to the present disclosure may include a variety of construction methodologies that are conventionally known, including the unibody construction methodology as well as a body-on-frame construction methodology.

Figure 1:
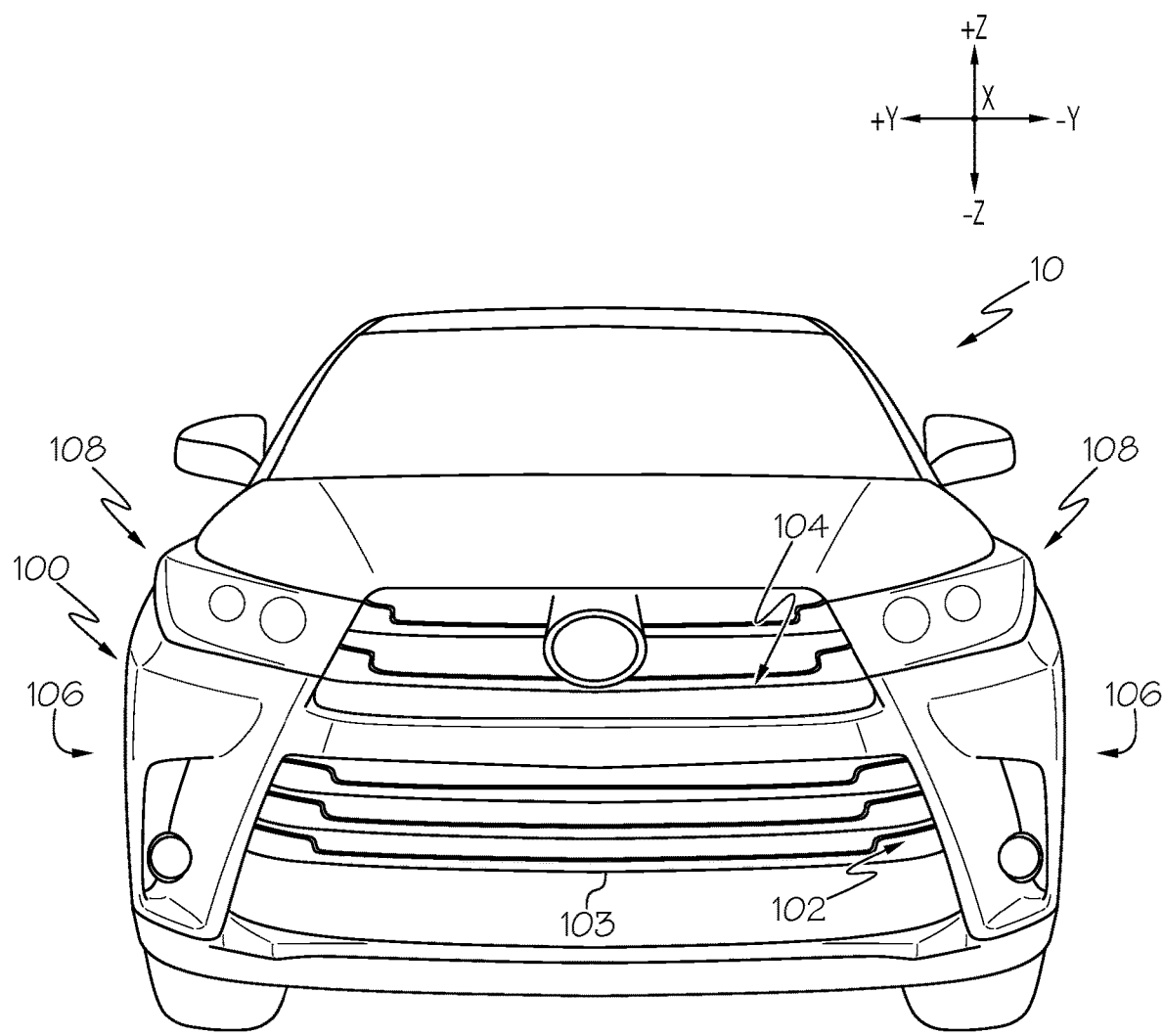
FIG. 1 depicts a front view of a vehicle with a grille assembly positioned at the front of the vehicle, according to one or more embodiments shown and described herein.

Referring initially to FIG. 1, a vehicle 10 includes a front end assembly 100. The front end assembly 100 includes a radiator grille assembly 102 that extends in a vehicle-lateral direction of the vehicle 10. The radiator grille assembly 102 includes a radiator grille 103 that includes an outer surface 114. The front end assembly 100 may further include an upper grille assembly 104. The vehicle 10 may also include front fenders 106 disposed at opposite sides of the radiator grille assembly 102 and the upper grille assembly 104 with headlamp assemblies 108.

Figure 2:
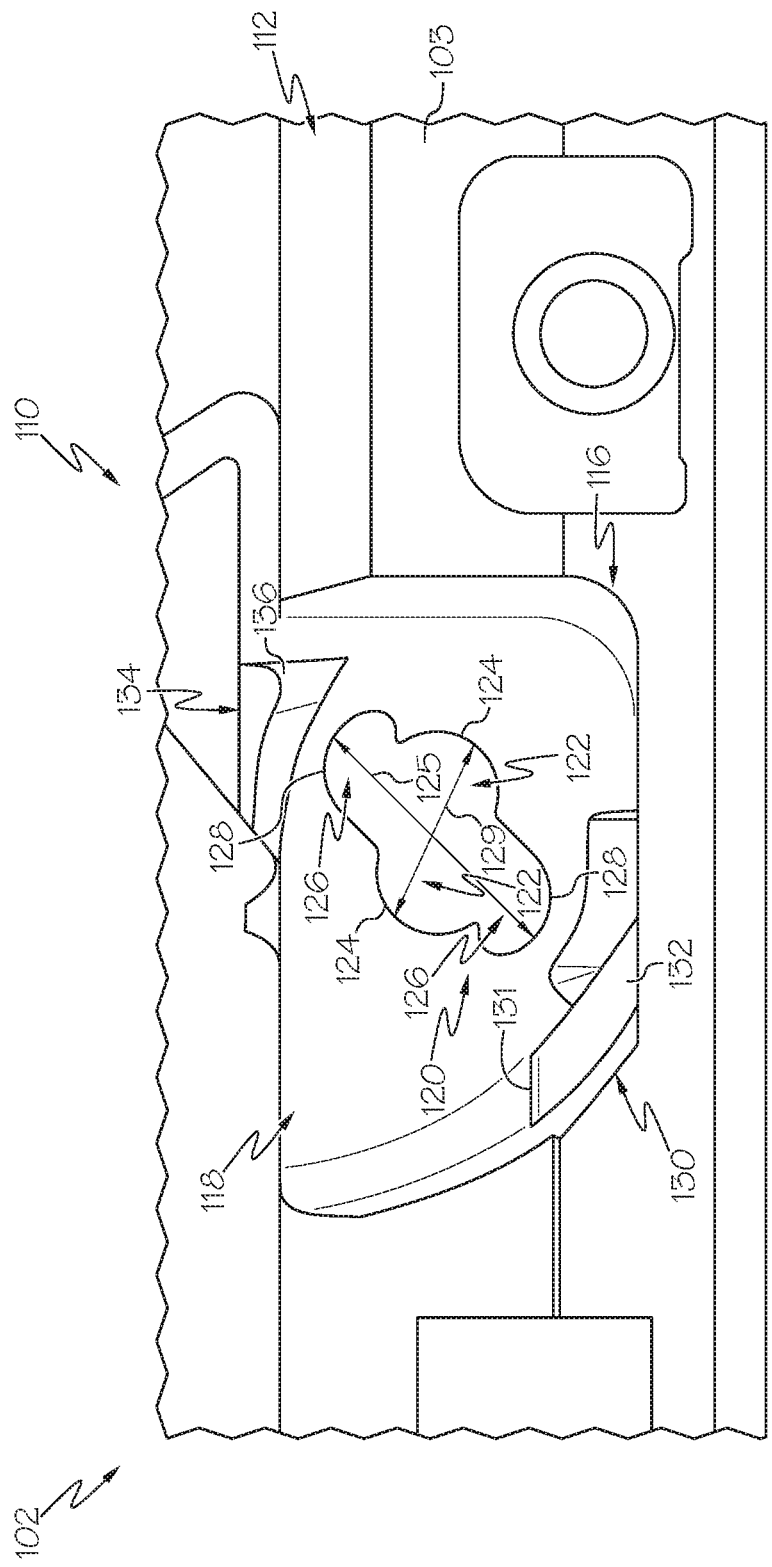
FIG. 2 depicts a plan view of a housing extending outwardly from an interior surface of the grille of FIG. 1, according to one or more embodiments shown and described herein.

Referring now to FIG. 2, a non-limiting example of a clamp assembly 110 is illustrated. In the illustrated embodiment, the clamp assembly 110 is provided on an inner surface 112 opposite the outer surface 114 of the radiator grille 103 of the vehicle 10. In the embodiments, the vehicle 10 is a sports utility vehicle (SUV). In some other embodiments, the vehicle 10 may be a truck, a car, van, boat, a plane, or other vehicle types. It should be noted that the clamp assembly 110 may be located at any suitable location on the vehicle 10, such as an inner surface of the upper grille assembly 104, on an inner surface of the fenders 106, or a rear end, driver's side, or passenger's side of the vehicle 10. Further, the clamp assembly 110 is not limited to use in a vehicle, and is operable to connect any one object to another object. Specifically, the clamp assembly 110 is configured to connect to a vehicle body component. In some embodiments, the clamp assembly 110 is configured to secure a component to the vehicle body component.

The radiator grille 103 further includes a housing 116 that extends outwardly from the inner surface 112 such that the housing 116 is elevated relative to the inner surface 112 of the radiator grille 103. The housing 116 includes an attachment surface 118 that defines a keyed slot 120 thereon. The keyed slot 120 is an opening that extends through the attachment surface 118. The keyed slot includes a first pair of recesses 122 and a second pair of recesses 126. In embodiments, the first pair of recesses 122 extend along the attachment surface 118 in a first direction and the second pair of recesses 126 extend along the attachment surface 118 in a second direction, with the first direction of the first pair of recesses 122 being different than the second direction of the second pair of recesses 126.

In the present example, the first pair of recesses 122 of the keyed slot 120 comprises edges 124 that define the first pair of recesses 122 along the attachment surface 118. In particular, the edges 124 are separated from one another along the attachment surface 118 by a first distance 125 such that a width of the first pair of recesses 122 is defined by the first distance 125. The second pair of recesses 126 of the keyed slot 120 comprises edges 128 that define the second pair of recesses 126 along the attachment surface 118. The edges 128 of the second pair of recesses 126 are separated from one another along the attachment surface 118 by a second distance 129, such that a width of the second pair of recesses 126 is defined by the second distance 129. In the present example, the first distance 125 between the edges 124 of the first pair of recesses 122 is less than the second distance 129 between the edges 128 of the second pair of recesses 126. As will be described in greater detail below, the first pair of recesses 122 are sized to securely engage and lock a clamp 140 to the housing 116 and the second pair of recesses 126 are sized to releasably disengage the clamp 140 from the housing 116.

Figure 3:
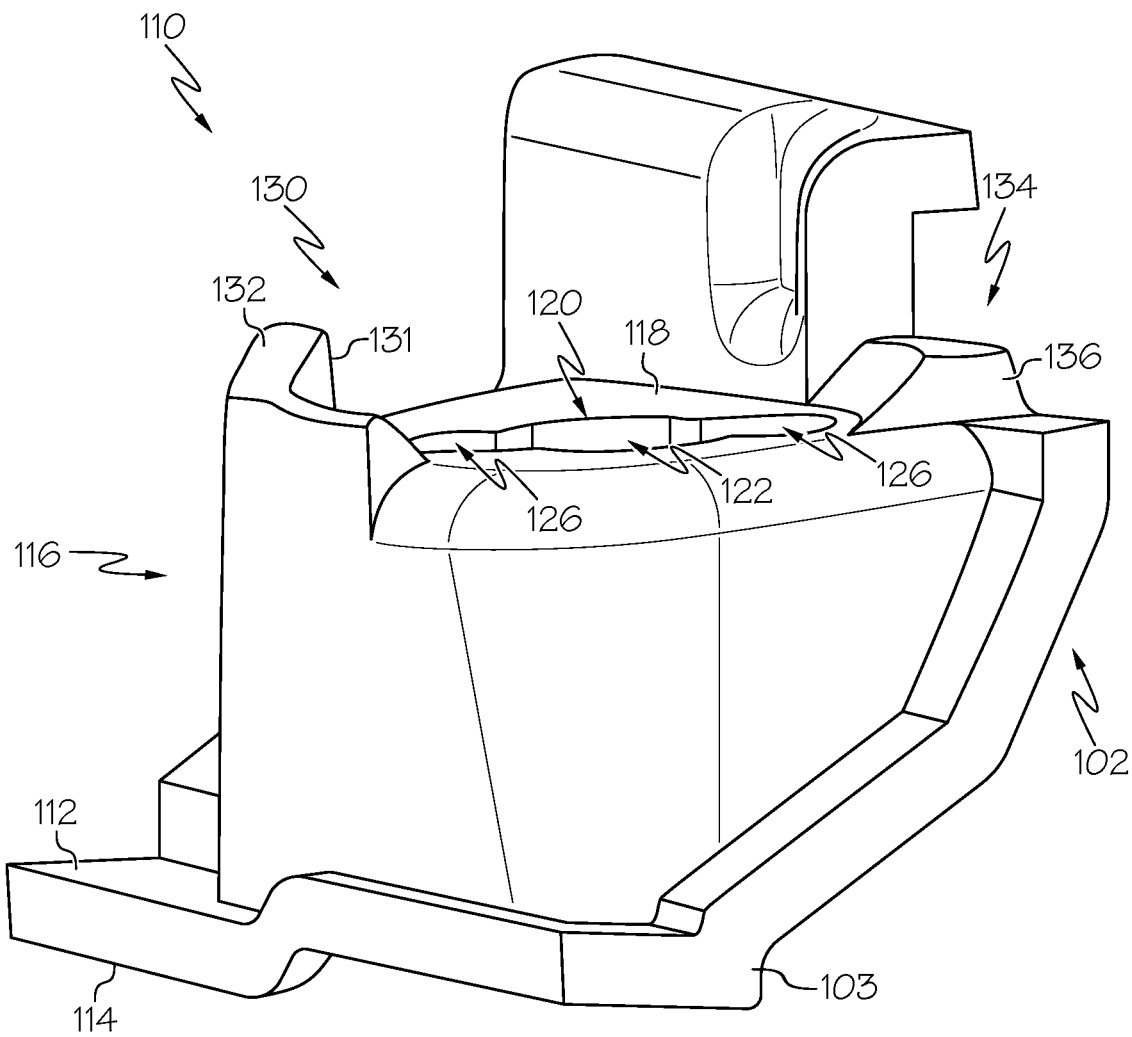
FIG. 3 depicts a perspective view of the housing of FIG. 1 including a protrusion having a tapered top surface, according to one or more embodiments shown and described herein.

The housing 116 of the radiator grille 103 further includes a protrusion 130 and a ramp 134 extending outwardly from the attachment surface 118. The protrusion 130 is positioned adjacent one of the second pair of recesses 126 of the keyed slot 120 and includes an abutment surface 131 and a tapered top surface 132. The abutment surface 131 extends generally perpendicular to a surface plane of the attachment surface 118. As best seen in FIG. 3, the tapered top surface 132 defines a sloped profile of the protrusion 130. Specifically, the slope profile of the tapered top surface 132 extends away from the abutment surface 131. As will be described further below, the protrusion 130 is sized and shaped to engage the clamp 140 received in the housing 116 and configured to inhibit rotation of the clamp 140 relative to the attachment surface 118 when the clamp 140 abuts against abutment surface 131 of the protrusion 130.

Referring to FIGS. 2 and 3, the tapered top surface 132 of the protrusion 130 is angled relative to surface plane of the attachment surface 118 and is configured to permit rotation of the clamp 140, as described in greater detail below, received within the housing 116 when the clamp 140 is received on the tapered top surface 132.

The ramp 134 is positioned adjacent to the other of the second pair of recesses 126 of the keyed slot 120 along a portion of the attachment surface 118 that is relatively opposite of the position of the protrusion 130. The ramp 134 comprises a tapered side surface 136 that defines a sloped profile of the ramp 134 relative to the attachment surface 118. The tapered side surface 136 defines an inclined profile of the ramp 134 that extends outwardly from the attachment surface 118. As described in greater detail below, the ramp 134 is sized and shaped to engage the clamp 140 received in the housing 116 and configured to release the clamp 140 from the attachment surface 118 in response to receiving the clamp 140 on the tapered side surface 136.

In the present example, the protrusion 130 and the ramp 134 are aligned with the second pair of recesses 126 of the keyed slot 120. However, it should be understood that in other embodiments the protrusion 130 and/or the ramp 134 may be positioned along various other portions of the housing 116 relative to the attachment surface 118 and the keyed slot 120. In some embodiments, the ramp 134 extends outwardly from the attachment surface 118 at a height that is substantially equal to a height of the protrusion 130. In some other embodiments, the ramp 134 extends outwardly from the attachment surface 118 at a height that is less than the height of the protrusion 130.

Referring now to FIGS. 4 and 5, the clamp assembly 110 further comprises the clamp 140. The clamp 140 includes a main body 142 and a connection portion 150. The main body 142 includes an exterior surface 141, an interior surface 143 opposite the exterior surface 141, and a pair of side edges 145. The main body 142 includes a distal end portion 144, a proximate end portion 148, and an intermediate portion 146 disposed between the distal end portion 144 and the proximate end portion 148. The distal end portion 144 and the proximate end portion 148 of the main body 142 extend laterally outward relative to the intermediate portion 146. It should be understood that the main body 142 and the connection portion 150 of the clamp 140 are integrally formed as a one piece monolithic structure and may be integrally molded of various polymeric materials. By way of example only, the clamp 140 is formed of plastic. In other embodiments, the main body 142 and the connection portion 150 may be separate features formed of different materials such that the main body 142 and the connection portion 150 are assembled together along the intermediate portion 146 of the main body 142.

Figure 7:
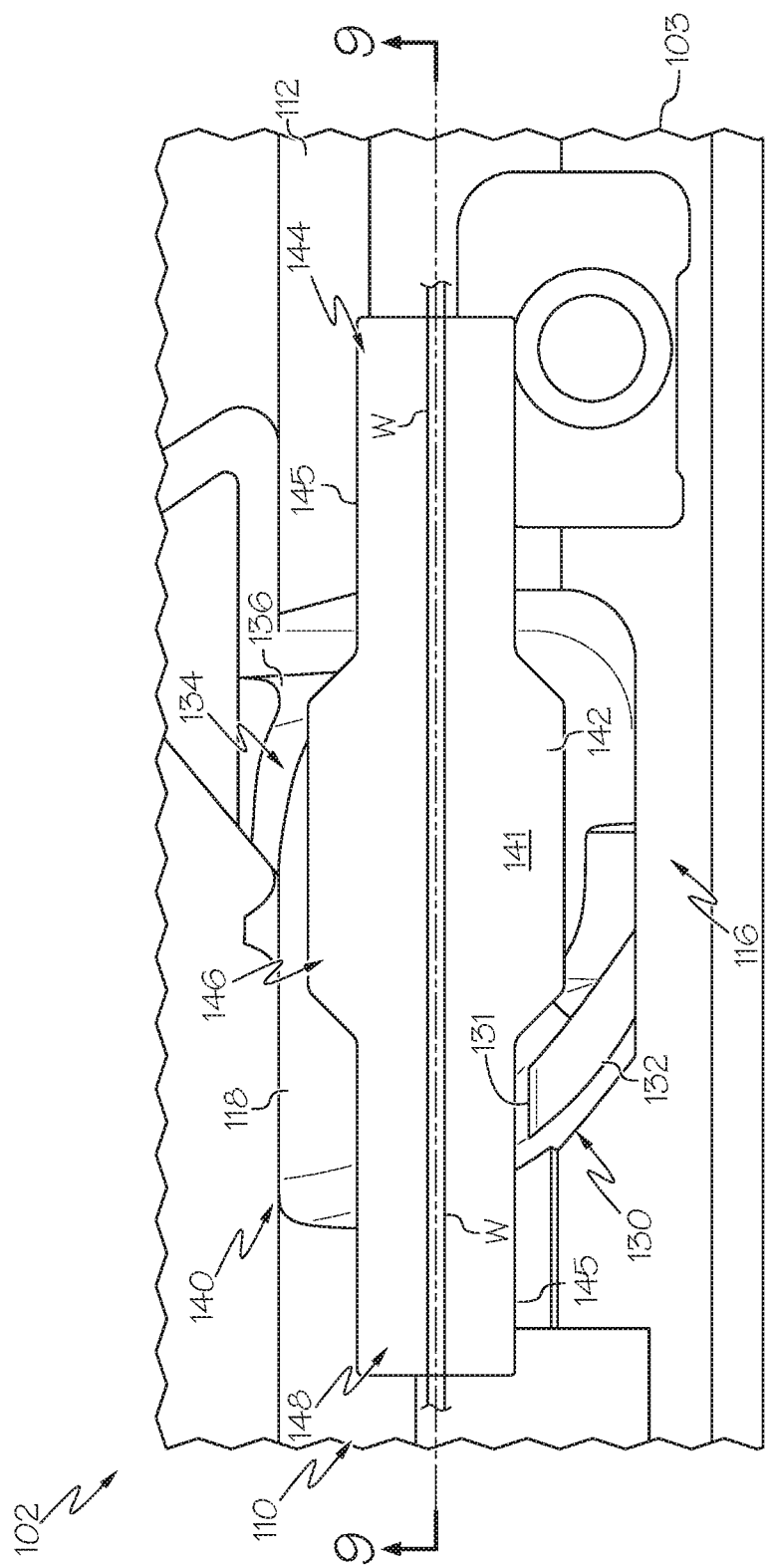
FIG. 7 depicts a plan view of the wire harness clamp of FIG. 4 attached to the housing of FIG. 1 in the an position with a wire harness secured to the wire harness clamp, according to one or more embodiments shown and described herein.

Referring to FIG. 7, the clamp 140 is sized and shaped to receive a component, such as a wire harness W along the exterior surface 141 so as to be a wire harness clamp configured to attach the wire harness W to the housing 116 of the radiator grille assembly 102. The wire harness W is attached to the main body 142 at least one of the distal end portion 144, intermediate portion 146, and proximate end portion 148. Further, the clamp 140 is configured to couple with the radiator grille 103 at the housing 116 such that the wire harness W attached to the clamp 140 is effectively coupled to the radiator grille 103. In some embodiments, the wire harness W is attached to the exterior surface 141 of the main body 142 by an adhesive, tape, fasteners, or other connection members configured to attach one object to another.

It should be noted that the clamp 140 may be used to secure other objects to the housing 116 of the radiator grille assembly 102, such as conduits, brake lines, coolant tubes, or other objects to be secured to the inner surface 112 of the radiator grille assembly 102.

Referring to FIGS. 4 and 5, the connection portion 150 of the clamp 140 extends outwardly from the interior surface 143 of the main body 142 at the intermediate portion 146 such that the connection portion 150 is disposed between the distal end portion 144 and the proximate end portion 148. The connection portion 150 includes a post 152 extending relatively outward from the interior surface 143 such that the post 152 is generally perpendicular to a longitudinal length of the main body 142. The connection portion 150 further includes a pair of snap tabs 154 extending outwardly from the post 152. As described in greater detail below, the pair of snap tabs 154 are hingedly connected to a lower end of the post 152 such that each of the pair of snap tabs 154 are individually articulated inwardly towards the post 152 between an uncompressed state and a compressed state.

The pair of snap tabs 154 include a plurality of steps 155 that extend outwardly from the pair of snap tabs 155 at an angle relative to a longitudinal length of the post 152. In the present example, each pair of snap tabs 154 includes three steps 155 extending outwardly from the pair of snap tabs 154, however, it should be understood that in other embodiments greater or fewer steps 155 may be included along the pair of snap tabs 154.

The pair of snap tabs 154 along each side of the post 152 extend outwardly at varying lengths such that the connection portion 150 defines a varying width along the longitudinal length of the post 152. In this instance, the steps 155 of the pair of snap tabs 154 form a stepped profile or arrangement along the longitudinal length of the post 152 such that the connection portion 150 comprises a wider width along an upper portion of the post 152 than a width along the lower portion of the post 152. In embodiments, the pair of snap tabs 154 are plastically deformable and resiliently biased to an uncompressed state (i.e., extended state) relative to the post 152, as seen in FIG. 4. In this instance, with the pair of snap tabs 154 in the uncompressed state, the connection portion 150 defines a width that is greater than a width when the pair of snap tabs 154 is in a compressed state (FIG. 5).

The connection portion 150 defines a pair of openings 156 positioned between the post 152 and each of the pair of snap tabs 154 such that the pair of snap tabs 154 is operable to hingedly flex inwardly toward the post 152 due to the presence of the pair of openings 156 positioned therebetween. The pair of snap tabs 154 are configured to transition to the compressed state when the pair of snap tabs 154 are pressed inwardly toward the post 152, such that the size of the pair of openings 156 become partially reduced. The connection portion 150 further includes a flange 157 that extends radially outward from the upper portion of the post 152.

Referring now to FIGS. 6-13, an exemplary use of the radiator grille assembly 102 and the clamp assembly 110 are illustrated. It should be understood that the exemplary use described herein is merely illustrative and that the radiator grille assembly 102 and the clamp assembly 110 may be used in various other methods. The exemplary use described herein provides for the connection of the wire harness W to the radiator grille 103 with the clamp assembly 110, and in particular, for the radiator grille assembly 102 and the clamp assembly 110 that connects the wire harness W to the radiator grille 103 of the vehicle 10 with the wire harness W secured to the clamp 140.

Figure 6:
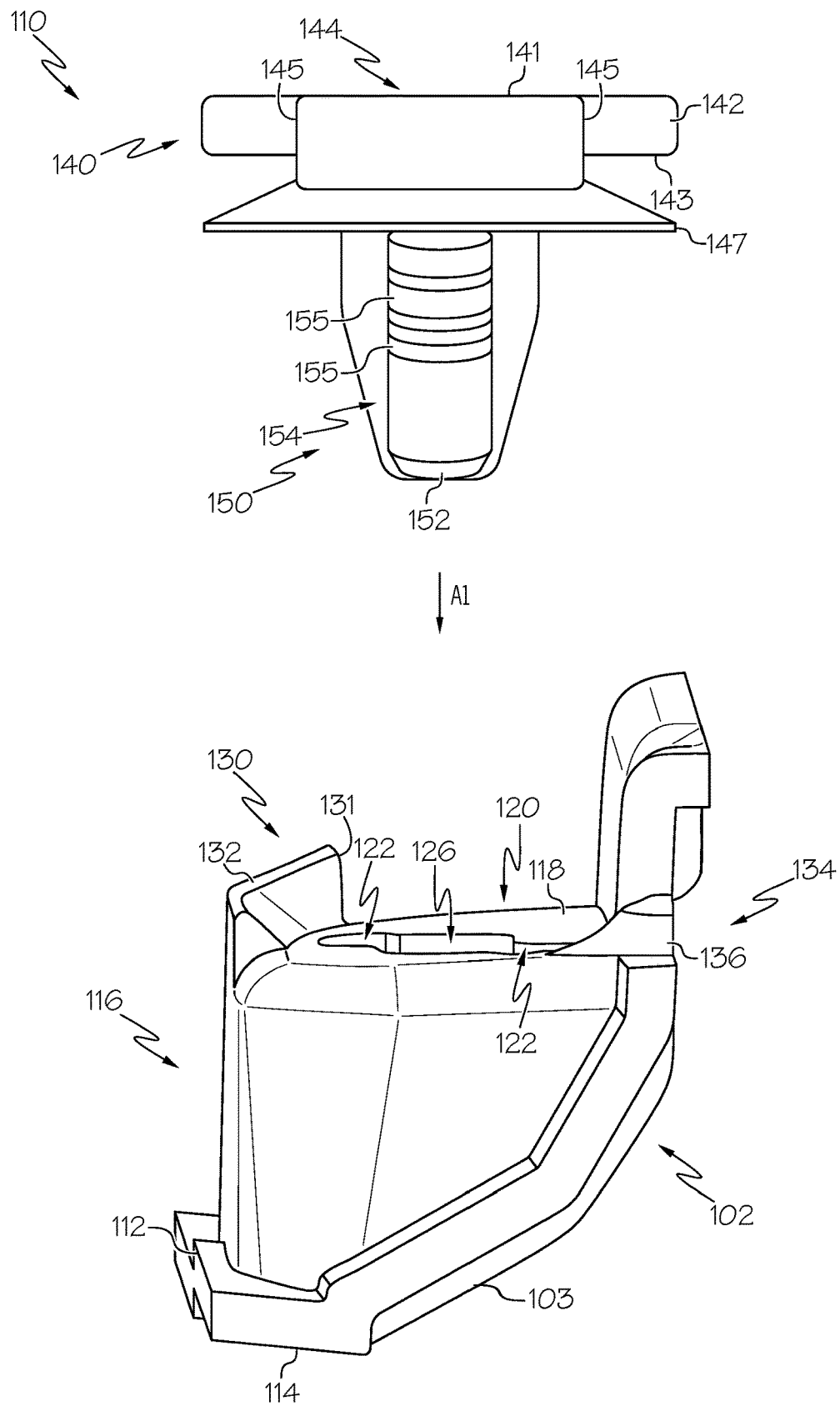
FIG. 6 depicts a side view of the wire harness clamp of FIG. 4 being inserted into the housing of FIG. 1 at an insertion direction, according to one or more embodiments shown and described herein.

FIG. 6 shows the clamp 140 aligned with housing 116 of the radiator grille 103, and in particular, the clamp 140 is moved in an insertion direction A1 toward the attachment surface 118 of the housing 116 with the pair of snap tabs 154 of the connection portion 150 aligned with the first pair of recesses 122 of the keyed slot 120. In this instance, the post 152 and the pair of snap tabs 154 are received through the keyed slot 120 of the housing 116. As the connection portion 150 is inserted into the keyed slot 120, the pair of snap tabs 154 of the connection portion 150 is secured to the attachment surface 118 by engaging the edges 124 of the first pair of recesses 122.

Referring now to FIG. 7, with the connection portion 150 received within the first pair of recesses 122 and the clamp 140 in the engaged position, the side edge 145 of the proximate end portion 148 of the main body 142 is positioned adjacent the abutment surface 131 of the protrusion 130 of the housing 116. With the abutment surface 131 of the protrusion 130 positioned adjacent the side edge 145 of the proximate end portion 148 the protrusion 130 is configured to inhibit movement (e.g., rotation) of the clamp 140, relative to the housing 116, from the engaged position to a disengaged position (FIG. 11). Specifically, when the main body 142 is rotated from the engaged position as shown in FIG. 7, towards the disengaged position, as shown in FIG. 11, the side edge 145 of the proximate end portion 148 abuts the abutment surface 131 of the protrusion 130, inhibiting rotation of the clamp 140 from rotating to the disengaged position. The wire harness W is coupled to the main body 142 of the clamp 140 along the exterior surface 141 such that the wire harness W is secured to at least one of the distal end portion 144, the intermediate portion 146, and the proximate end portion 148 of the clamp 140. With the wire harness W secured to the clamp 140, and the clamp 140 coupled to the radiator grille 103, the wire harness W is effectively attached to the radiator grille 103.

Figure 8:
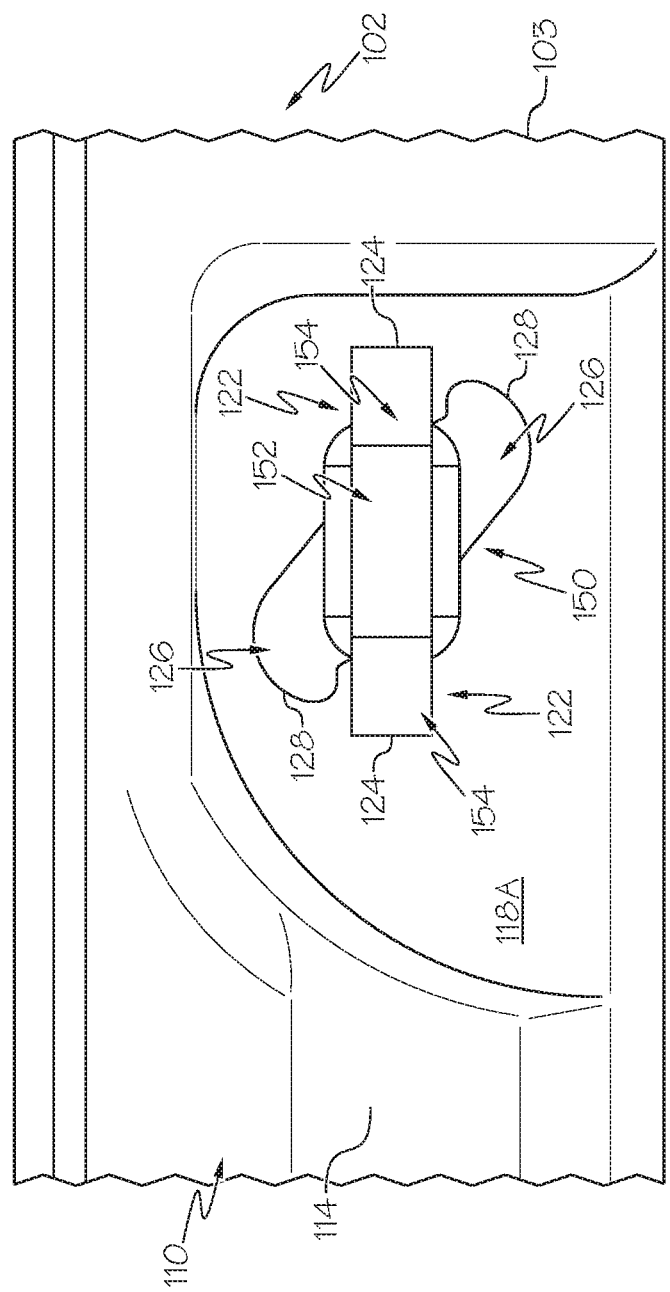
FIG. 8 depicts an interior plan view of the wire harness clamp of FIG. 4 attached to the housing of FIG. 1 in the engaged position, according to one or more embodiments shown and described herein.

Referring to FIGS. 6-8, as the clamp 140 is inserted into the keyed slot 120 in the insertion direction A1, the edges 124 of the first pair of recesses 122 engage the pair of snap tabs 154 to thereby securely couple the clamp 140 to the housing 116 of the radiator grille 103. In particular, the edges 124 are separated from one another along the attachment surface 118 by the first distance 125 that defines a width of the first pair of recesses 122. The pair of snap tabs 154, in an uncompressed state, define a width that is greater than the first distance 125 of the first pair of recesses 122 such that inserting the connection portion 150 in the insertion direction A1 into the keyed slot 120 with the pair of snap tabs 154 aligned with the first pair of recesses 122 results in the edges 124 engaging and compressing the pair of snap tabs 154 inwardly toward the post 152 from the uncompressed state to the compressed state. Accordingly, the pair of snap tabs 154 abut against the edges 124 when the connection portion 150 is inserted in the first pair of recesses 122, thereby effectively coupling the connection portion 150 to the housing 116 in an engaged position.

Figure 9:
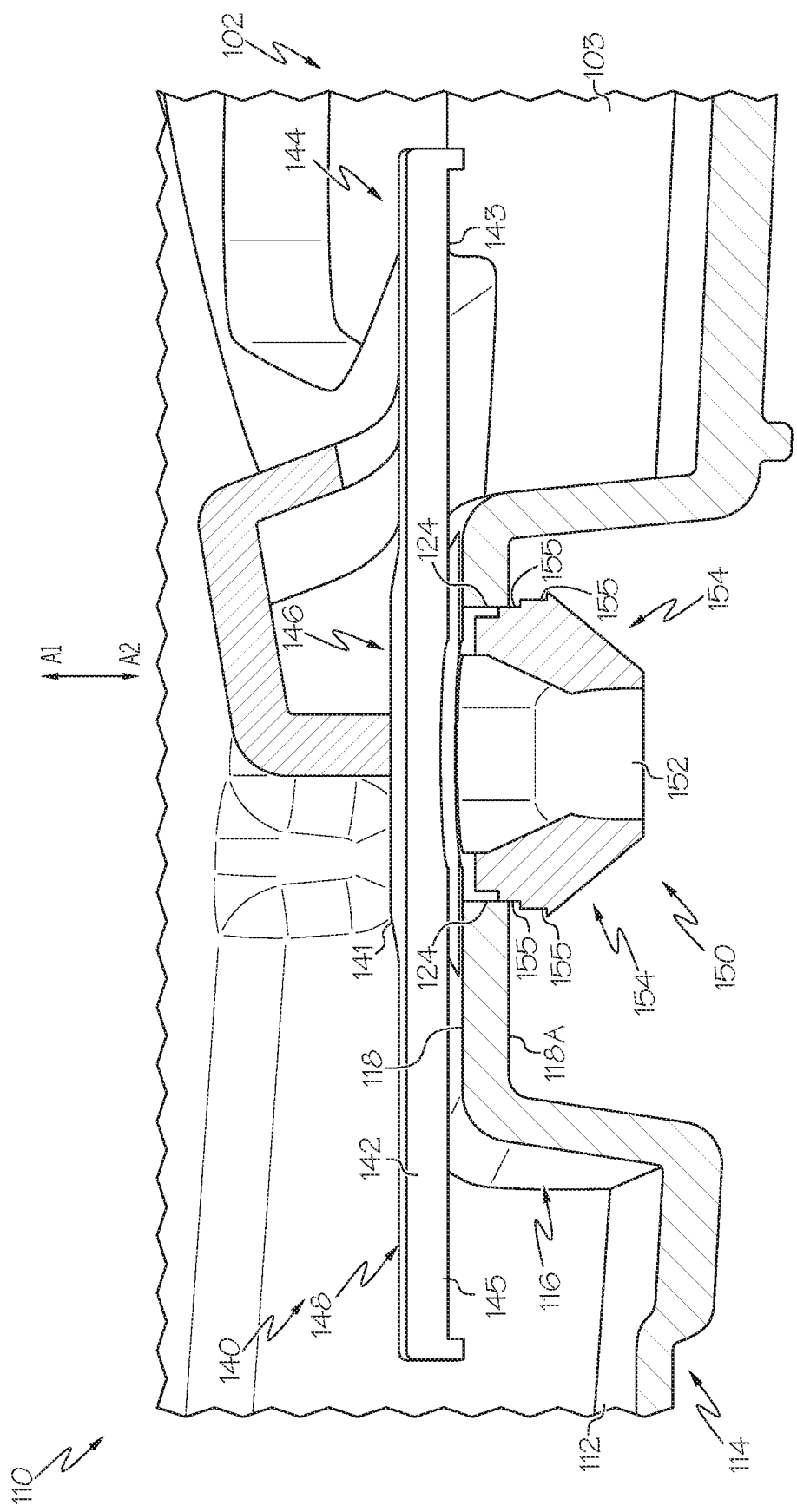
FIG. 9 depicts a cross sectional view of the wire harness clamp of FIG. 4 attached to the housing of FIG. 1 in the engaged position, according to one or more embodiments shown and described herein, with the cross section taken along line 9-9 of FIG. 7.

As further seen in FIG. 9, with the connection portion 150 engaged with the first pair of recesses 122, the edges 124 of the first pair of recesses 122 interlock with the steps 155 of the pair of snap tabs 154 such that the edges 124 are configured to inhibit extraction of the connection portion 150 from the keyed slot 120 in an extraction direction A2 that is opposite of the insertion direction A1. The steps 155 of the pair of snap tabs 154 engage with an underside 118A of the attachment surface at the edges 124 of the first pair of recesses 122 of the keyed slot 120.

Figure 10B:
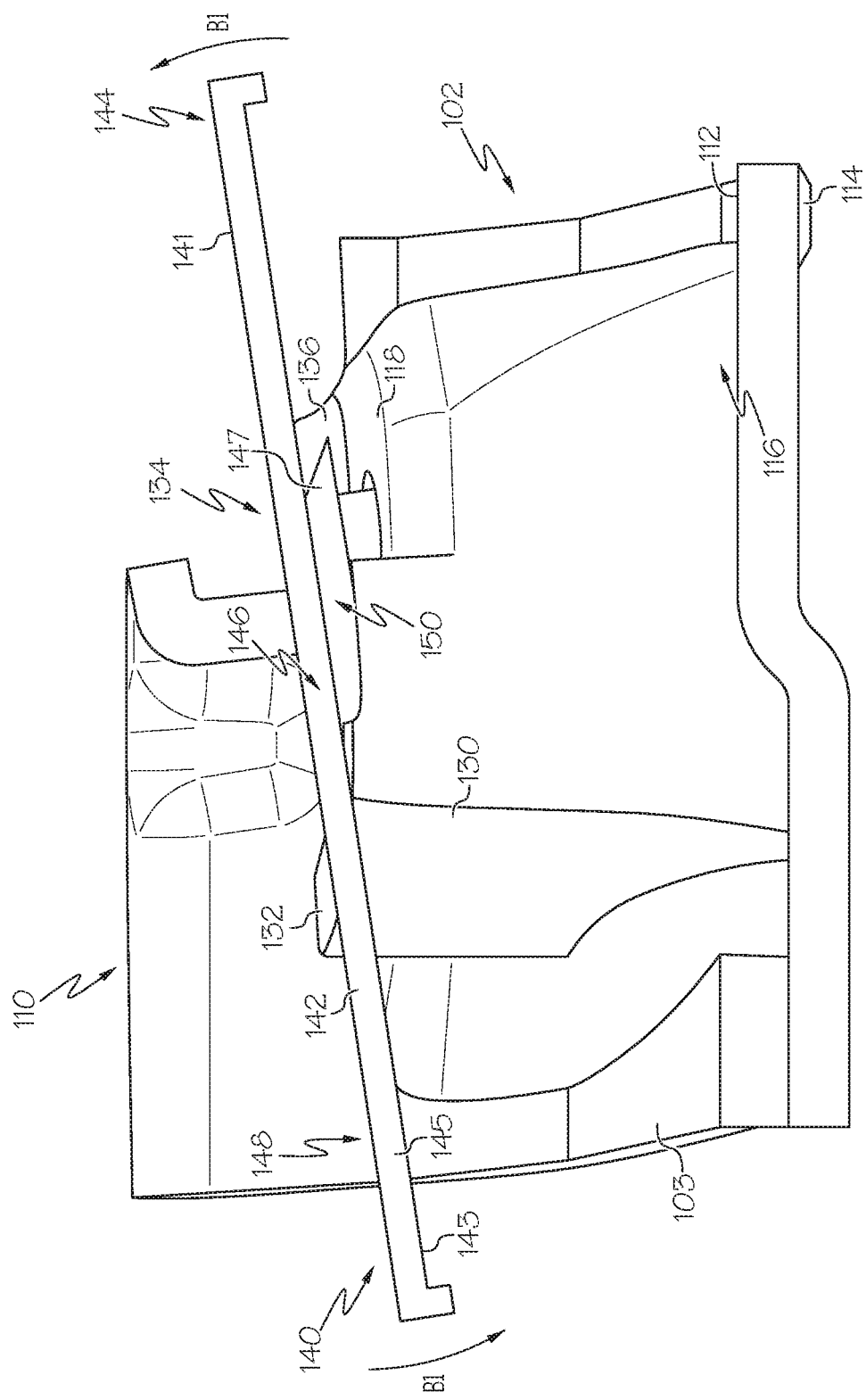
FIG. 10B depicts a perspective view of the wire harness clamp of FIG. 4 attached to the housing of FIG. 1 in the disengaged position, with the proximate end portion of the wire harness clamp positioned over the protrusion and a distal end portion of the wire harness clamp positioned over a ramp of the housing, according to one or more embodiments shown and described herein.

Referring now to FIGS. 10A and 10B, to detach the clamp 140 from the radiator grille 103, the proximate end portion 148 must be lifted upwardly relative to the attachment surface 118 parallel to the extraction direction A2 such that the proximate end portion 148 is raised above a height of the protrusion 130. In this instance, the proximate end portion 148 of the clamp 140 no longer abuts against the abutment surface 131 of the protrusion 130 upon rotation of the clamp 140, form the engaged position towards the disengaged position, in the direction of arrow B1.

Referring now to FIG. 10B, the proximate end portion 148 is rotated in the direction of arrow B1 toward the protrusion 130 and the distal end portion 144 is rotated about the intermediate portion 146 toward the ramp 134. In this instance, the proximate end portion 148, and in particular the interior surface 143 of the proximate end portion 148, slidably translates along the tapered top surface 132 of the protrusion 130 as the clamp 140 rotates from the engaged position to the disengaged position. Upon rotation of the clamp 140 from the engaged position towards the disengaged position, the tapered top surface 132 of the protrusion 130 guides the proximate end portion 148 downward toward the attachment surface 118.

Simultaneously, the distal end portion 144, and in particular the interior surface 143 of the main body 142 along the distal end portion 144, slidably translates along the tapered side surface 136 of the ramp 134 as the clamp 140 rotates from the engaged position towards the disengaged position. Upon rotation of the clamp 140 from the engaged position towards the disengaged position, the tapered side surface 136 of the ramp 134 guides the distal end portion 144 upward away from the attachment surface 118. It should be understood that the tapered top surface 132 of the protrusion 130 is configured to guide the proximate end portion 148 downward to a height that is substantially similar to a height of the ramp 134, in which the distal end portion 144 of the clamp 140 is elevated to by the tapered side surface 136 of the ramp 134 as the clamp 140 is rotated from the engaged position toward the disengaged position.

Figure 12:
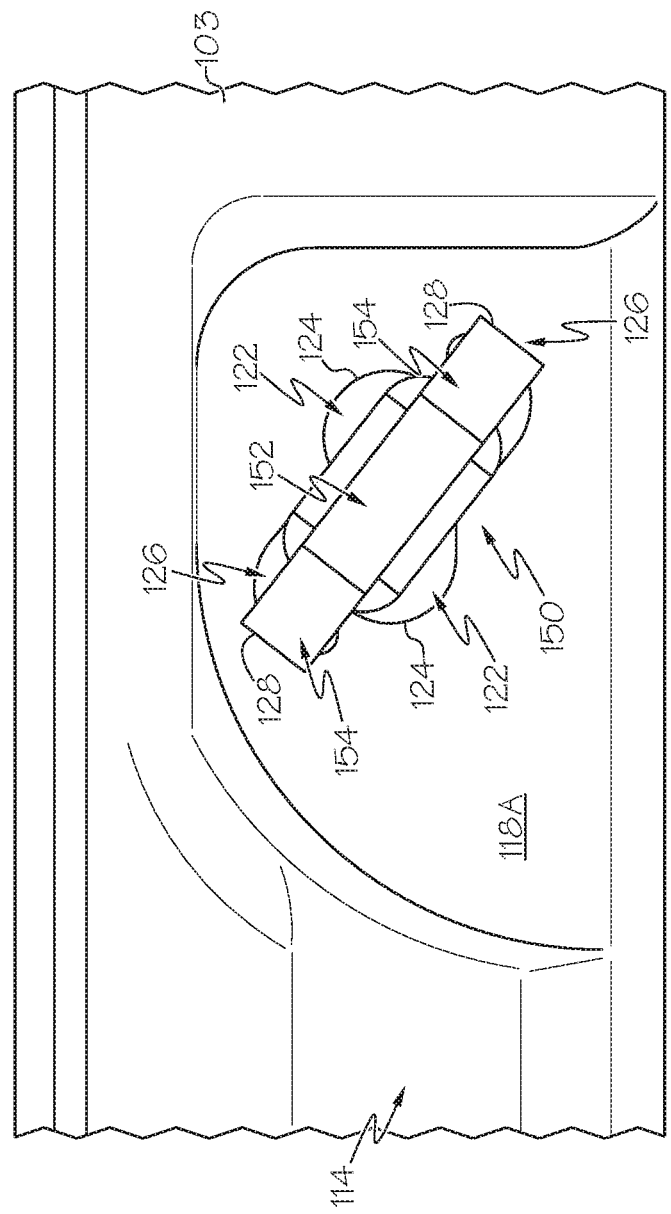
FIG. 12 depicts an interior plan view of the wire harness clamp of FIG. 4 in the disengaged position, according to one or more embodiments shown and described herein.

Referring now to FIG. 12, with the clamp 140 in the disengaged position, the connection portion 150 is effectively elevated relative to the keyed slot 120 due to the proximate end portion 148 being positioned above the protrusion 130 and the distal end portion 144 being positioned above the ramp 134. In other words, the protrusion 130 is configured to inhibit movement of the clamp 140 in the insertion direction A1 by abutting against the proximate end portion 148 of the main body 142. Similarly, the ramp 134 is configured to inhibit movement of the clamp 140 in the insertion direction A1 by abutting against the distal end portion 144 of the main body 142. It should be understood that at least a portion of the connection portion 150, and in particular the post 152 and/or the pair of snap tabs 154, may be at least partially received within the second pair of recesses 126 when the clamp 140 is in the disengaged position despite the protrusion 130 and the ramp 134 elevating the connection portion 150 relative to the keyed slot 120.

The protrusion 130 and the ramp 134 are further configured to elevate the post 152 and the pair of snap tabs 154 relative to the keyed slot 120 to inhibit engagement of the pair of snap tabs 154 with the second pair of recesses 126, and in particular the underside 118A of the attachment surface 118 adjacent the pair of edges 128 of the second pair of recesses 126. As the interior surface 143 of the proximate end portion 148 rests on the tapered top surface 132 of the protrusion 130 and the interior surface 143 of the distal end portion 144 rests on the ramp 134, the clamp 140 is elevated above the attachment surface 118 such that the pair of snap tabs 154 are inhibited from engaged with the underside 118A of the attachment surface 118 adjacent the edges 128 of the second pair of recesses 126 even when the clamp 140 is moved in the insertion direction A1. As the elevation of the main body 142 above the attachment surface 118 inhibits the engagement of the pair of snap tabs 154 with the keyed slot 120 in the disengaged position, the clamp 140 is inhibited from being reengaged with the keyed slot 120. In order to remove the clamp 140 from the keyed slot 120, the clamp 140 is moved in the extraction direction A2 relative to the housing 116 and opposite of the insertion direction A1.

Figure 13:
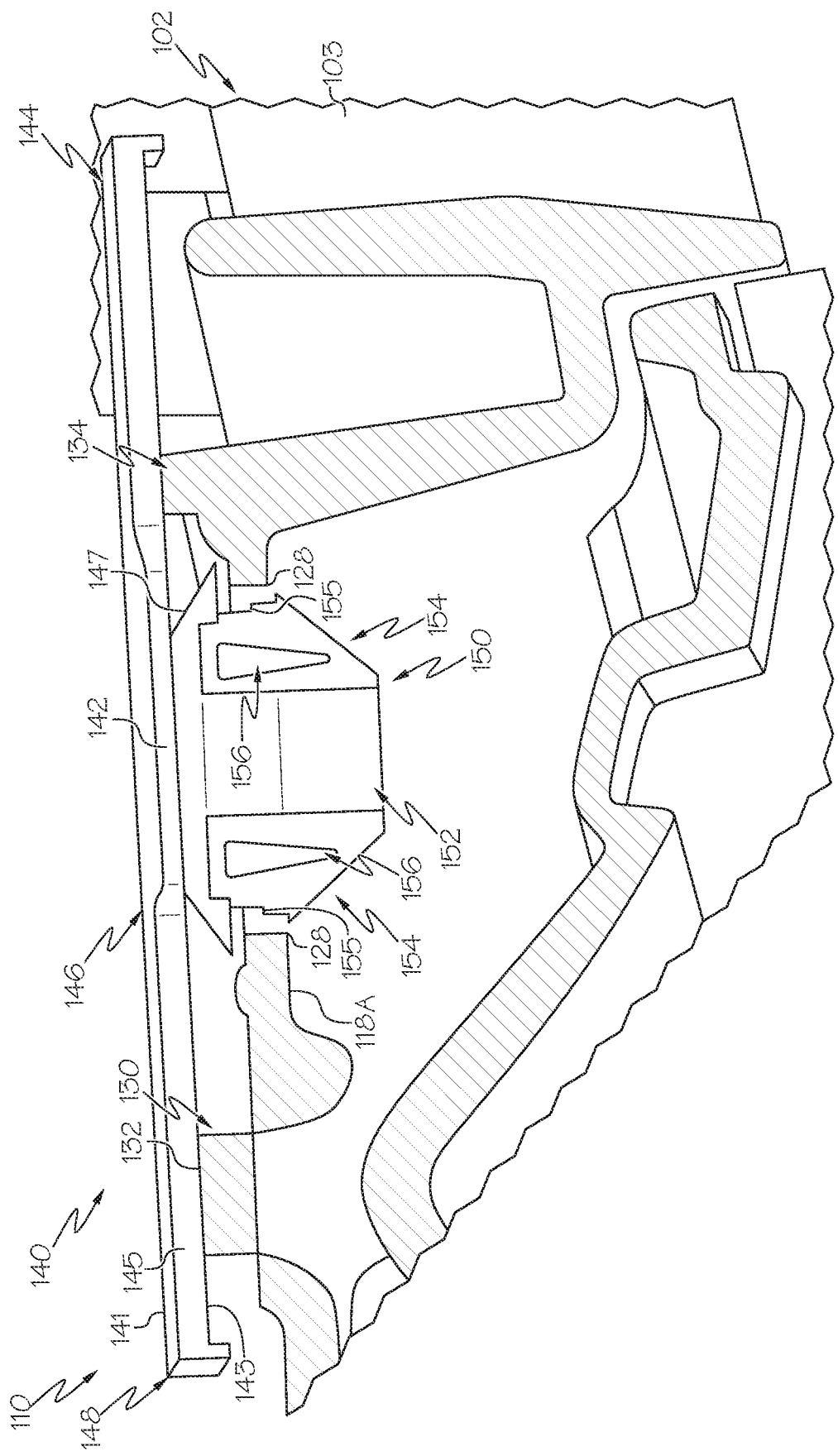
FIG. 13 depicts a cross sectional view of the wire harness clamp of FIG. 4 in the disengaged position, according to one or more embodiments shown and described herein, with the cross section taken along the line 13-13 of FIG. 11.

Referring now to FIGS. 12 and 13, in this instance the connection portion 150 is aligned with the second pair of recesses 126 such that the pair of snap tabs 154 are received within the second pair of recesses 126. With the clamp 140 in the disengaged position, the pair of snap tabs 154 are disengaged from the edges 128 of the second pair of recesses 126. In particular, the second distance 129 between the edges 128 of the second pair of recesses 126 is greater than the first distance 125 between the edges 124 of the first pair of recesses 122.

Further, the second pair of recesses 126 is sized to releasably disengage the clamp 140 from the housing 116 as the second distance 129 between the edges 128 of the second pair of recesses 126 is greater than a width of the pair of snap tabs 154 when in an uncompressed state. Accordingly, rotating the clamp 140 to the disengaged position effectively disengages the connection portion 150 from the housing 116. In this instance, the housing 116 of the radiator grille 103 permits movement of the connection portion 150 of the clamp 140 in the extraction direction A2 to thereby permit removal of the clamp 140 from the radiator grille 103. It should be understood that in the disengaged position, a distance between the interior surface 143 of the main body 142 and the attachment surface 118 is greater than a distance between the interior surface 143 and the attachment surface 118 when the clamp 140 is in the engaged position.

The above-described clamp assembly and grille assembly provide a grille having a housing that includes an attachment surface defining a keyed slot, with the keyed slot having a first pair of recesses and a second pair of recesses that are sized to receive a clamp therein. The attachment surface of the grille further includes an outwardly extending protrusion. The wire harness clamp includes a main body and a connection portion, with the main body including an intermediate portion positioned between a distal end portion and a proximate end portion, and the connection portion extending outwardly from the intermediate portion and being configured to be inserted within the keyed slot. The clamp is configured to be received within the keyed slot and rotatable between an engaged position and a disengaged position, where in the engaged position the connection portion engages with the first pair of recesses to inhibit extraction of the clamp from the keyed slot and the proximate end portion abuts the protrusion to inhibit rotation of the clamp from the engaged position to the disengaged position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A clamp assembly comprising:
   a housing that includes an attachment surface that defines a keyed slot, the keyed slot having a first pair of recesses that extend in a first direction and a second pair of recesses that extend in a second direction different from the first direction, the attachment surface includes an outwardly extending protrusion; and
   a clamp that includes a main body and a connection portion, the main body includes an intermediate portion positioned between a distal end portion and a proximate end portion, the connection portion extends outwardly from the intermediate portion, at least a portion of the connection portion is configured to be inserted within the keyed slot in an insertion direction, the clamp configured to be received within the keyed slot and rotatable between an engaged position and a disengaged position, in the engaged position the connection portion engages within the first pair of recesses of the keyed slot to inhibit movement in an extraction direction opposite the insertion direction and the proximate end portion abuts the protrusion to inhibit rotation of the clamp from the engaged position to the disengaged position.

2. The clamp assembly of claim 1, in the disengaged position the connection portion is received within the second pair of recesses and permits movement in the extraction direction.

3. The clamp assembly of claim 2, wherein in order to rotate the clamp from the engaged position to the disengaged position, the proximate end portion is raised over the protrusion and rotated to the disengaged position.

4. The clamp assembly of claim 3, wherein the attachment surface includes a ramp that inclines outwardly from the attachment surface, wherein upon rotation of the clamp from the engaged position to the disengaged position, the ramp guides the distal end portion such that in the disengaged position the connection portion is elevated relative to the keyed slot to inhibit engagement with the second pair of recesses to permit movement of the clamp in the extraction direction and inhibit movement of the clamp in the insertion direction.

5. The clamp assembly of claim 4, wherein the connection portion includes a post that includes a pair of snap tabs extending outwardly therefrom.

6. The clamp assembly of claim 5, wherein in the engaged position the pair of snap tabs engage with the first pair of recesses to inhibit movement in the extraction direction.

7. The clamp assembly of claim 6, wherein a distance between edges of the first pair of recesses is less than a distance between edges of the second pair of recesses, and in the disengaged position the pair of snap tabs do not engage with the edges of the second pair of recesses to permit the clamp to move in the extraction direction.

8. The clamp assembly of claim 7, wherein the pair of snap tabs in an uncompressed state have a width that is greater than a distance between the edges of the first pair of recesses, and the width of the pair of snap tabs in the uncompressed state is less than a distance between the edges of the second pair of recesses.

9. The clamp assembly of claim 8, wherein the main body includes an exterior surface and an opposite interior surface, the post of the connection portion extends outwardly from the interior surface of the main body, in the engaged position a distance between the interior surface of the main body and the attachment surface is less than a distance between the interior surface of the main body and the attachment surface in the disengaged position.

10. The clamp assembly of claim 9, wherein contact between the interior surface of the main body and the ramp inhibits movement of the clamp in the insertion direction.

11. A grille assembly comprising:
a grille that includes an outer surface and an opposite inner surface, the grille includes a housing that extends outwardly from the inner surface, the housing includes an attachment surface that defines a keyed slot, the keyed slot having a first pair of recesses that extend in a first direction and a second pair of recesses that extend in a second direction different from the first direction, the attachment surface includes an outwardly extending protrusion; and
a clamp that includes a main body and a connection portion, the main body includes an intermediate portion positioned between a distal end portion and a proximate end portion, the connection portion extends outwardly from the intermediate portion, at least a portion of the connection portion is configured to be inserted within the keyed slot in an insertion direction, the clamp is configured to be received within the keyed slot and rotatable between an engaged position and a disengaged position, in the engaged position the connection portion engages within the first pair of recesses of the keyed slot to inhibit movement in an extraction direction opposite the insertion direction and the proximate end portion abuts the protrusion to inhibit rotation of the clamp from the engaged position to the disengaged position, in the disengaged position the connection portion is received within the second pair of recesses and permits movement in the extraction direction.

12. The grille assembly of claim 11, wherein in order to rotate the clamp from the engaged position to the disengaged position, the proximate end portion is raised over the protrusion and rotated to the disengaged position.

13. The grille assembly of claim 12, wherein the connection portion includes a post that includes a pair of snap tabs extending outwardly therefrom, and a distance between edges of the first pair of recesses is less than a distance between edges of the second pair of recesses, and in the engaged position the pair of snap tabs engage with the edges of the first pair of recesses to inhibit movement in the extraction direction, and in the disengaged position the pair of snap tabs do not engage with the edges of the second pair of recesses to permit the clamp to move in the extraction direction.

14. The grille assembly of claim 13, wherein the attachment surface includes a ramp that inclines outwardly from the attachment surface, wherein upon rotation of the clamp from the engaged position to the disengaged position, the ramp guides the distal end portion such that in the disengaged position the connection portion is elevated relative to the keyed slot to inhibit engagement with the second pair of recesses to permit movement of the clamp in the extraction direction and inhibit movement of the clamp in the insertion direction.

15. The grille assembly of claim 14, wherein the pair of snap tabs in an uncompressed state have a width that is greater than a distance between the edges of the first pair of recesses, and the width of the pair of snap tabs in the uncompressed state is less than a distance between the edges of the second pair of recesses.

16. The grille assembly of claim 15, wherein the main body includes an exterior surface and an opposite interior surface, the post of the connection portion extends outwardly from the interior surface of the main body, in the engaged position a distance between the interior surface of the main body and the attachment surface is less than a distance between the interior surface of the main body and the attachment surface in the disengaged position.

17. The grille assembly of claim 16, wherein contact between the interior surface of the main body and the ramp inhibits movement of the clamp in the insertion direction.

18. A method of connecting a component to a grille of a vehicle, the component is secured to a clamp, and the grille includes a housing extend outwardly from an inner surface of the grille, the housing includes an attachment surface that includes a keyed slot having a first pair of recesses that extend in a first direction and a second pair of recesses that extend in a second direction different from the first direction, the method comprising:

inserting a connection portion of the clamp in an insertion direction into the pair of first recesses of the keyed slot into an engaged position, the connection portion extending from an intermediate portion of a main body of the clamp, the intermediate portion positioned between a proximate end portion and a distal end portion, in the engaged position the clamp is inhibited from movement in an extraction direction opposite the insertion direction, in the engaged position the proximate end portion abuts a protrusion that extends outwardly from the attachment surface to prevent rotation of the clamp from the engaged position to a disengaged position;

lifting the proximate end portion of the clamp away from the attachment surface to raise the proximate end portion over the protrusion and rotating the clamp from the engaged position to the disengaged position in which the connection portion is received within the second pair of recesses of the keyed slot, in the disengaged position the clamp is permitted to move in the extraction direction; and removing the clamp from the keyed slot in the extraction direction.

19. The method of claim 18, wherein the attachment surface includes a ramp that inclines outwardly from the attachment surface, wherein upon rotation of the clamp from the engaged position to the disengaged position, the ramp guides the distal end portion such that in the disengaged position the connection portion is elevated relative to the keyed slot to inhibit engagement with the second pair of recesses to permit movement of the clamp in the extraction direction and inhibit movement of the clamp in the insertion direction.

20. The method of claim 19, wherein the connection portion includes a post that includes a pair of snap tabs extending outwardly therefrom, and wherein a distance between edges of the first pair of recesses is less than a distance between edges of the second pair of recesses, and in the disengaged position the connection portion does not engage with the edges of the second pair of recesses to permit the clamp to move in the extraction direction, the pair of snap tabs in an uncompressed state have a width that is greater than a distance between the edges of the first pair of recesses, and the width of the pair of snap tabs in the uncompressed state is less than a distance between the edges of the second pair of recesses.

\* \* \* \* \*